United States Patent [19]

Grundmann

[11] Patent Number: 5,247,419
[45] Date of Patent: Sep. 21, 1993

[54] LOW VOLTAGE SWITCHGEAR

[76] Inventor: Ernst H. Grundmann, 4005 Meerbusch 2, Am Sportplatz 36a,, Fed. Rep. of Germany

[21] Appl. No.: 781,804

[22] Filed: Oct. 28, 1991

[30] Foreign Application Priority Data

Oct. 30, 1990 [DE] Fed. Rep. of Germany ....... 4034485

[51] Int. Cl.$^5$ .............................................. H02H 3/08
[52] U.S. Cl. .................................... 361/94; 361/102; 361/152; 361/187
[58] Field of Search ...................... 361/93, 94, 95, 97, 361/102, 115, 152, 154, 187, 195

[56] References Cited

U.S. PATENT DOCUMENTS

| | | | |
|---|---|---|---|
| 4,914,541 | 4/1990 | Tripodi et al. | 361/94 |
| 4,967,309 | 10/1990 | Hoffman | 361/160 |
| 5,105,326 | 4/1992 | Shimp et al. | 361/49 |

FOREIGN PATENT DOCUMENTS

| | | |
|---|---|---|
| 0212677 | 3/1987 | European Pat. Off. |
| 1614516 | 12/1971 | Fed. Rep. of Germany |
| 2940953 | 4/1981 | Fed. Rep. of Germany |
| 3301866 | 7/1984 | Fed. Rep. of Germany |
| 3304921 | 8/1984 | Fed. Rep. of Germany |
| 3940242 | 7/1990 | Fed. Rep. of Germany |
| 2227608 | 8/1990 | United Kingdom |

OTHER PUBLICATIONS

Heinz Greif, *Moderne Relais und ihre Schaltungen*, Jun. 24, 1987, pp. 99-100.
Hans Sauer, *Relais-Lexikon*, 1985, p. 137.

*Primary Examiner*—Todd E. DeBoer
*Attorney, Agent, or Firm*—Sixbey, Friedman, Leedom & Ferguson

[57] ABSTRACT

A low voltage switchgear with a single or multipole contact arrangement (1) with a corresponding number of fixed contacts (2) and movable contacts (3), a magnet armature (4) that moves the movable contacts (3), at least one magnet coil (5) that is energized by direct current and a setpoint switch release (9). The magnet armature (4) operates in a bistable way and is kept in the respectively reached switching position The switchgear is universally usable and becomes reliable by providing an overcurrent protective circuit (13) that energizes the magnet coil (5) after a predetermined time delay by direct current in the conduction direction necessary to reach the switching-off position of magnet armature (4) when an overcurrent that lies below a threshold overcurrent appears at least at one connected pole (12), and when a current that reaches or exceeds a threshold overcurrent appears at least at one connected pole (12), the magnet coil (5) is energized with direct current in the conduction direction necessary to reach the switching-off position of magnet armature (4) as rapidly as possible.

24 Claims, 3 Drawing Sheets

LOW VOLTAGE SWITCHGEAR

BACKGROUND OF THE INVENTION

The invention relates to a low voltage switchgear for a certain nominal current, in particular in alternating voltage systems, with a single or multipole contact system with a corresponding number of fixed contacts and movable contacts, a magnet armature that moves movable contacts, at least one magnet coil energized by direct current and a setpoint switch release. More particularly to such a switchgear in which the magnet armature operates in a bistable way, namely by brief direct current energizing of the magnet coil released by the setpoint switch release with one of two possible conduction directions, so that it can be brought into one of two switching positions, namely a switching-on or a switching-off position, and remains in the respectively reached switching position.

The known low voltage switchgear, on which the invention is based (published German application DE-A 3 940 242), is suitable for low voltages in the range of 110 volts, 220 volts, 380 volts, and depending on how it is equipped, can switch nominal currents from several amperes up to 20 A and more. When this low voltage switchgear is equipped with a corresponding arc-quenching device at the contact system, higher currents can also be switched.

The known low voltage switchgear is suitable especially for switching multipole contact systems, for example, all three phases of a three-phase alternating voltage network. The movable contacts of the contact system, here, are moved by magnet armatures that are moved by one or two magnet coils which, for their part, are energized primarily by direct current. The magnet armature is made as a permanent magnet armature consisting of one or more permanent magnets with identical or opposite poles. In various embodiments, monostable or bistable solutions with one or two magnet coils and one or two permanent magnets in the magnet armature are described for this low voltage switchgear. There, it is explained in detail how the magnet armature can be kept in one of two switching positions, in each case, by the action of the permanent magnets. As an alternative to positioning by magnetic force, a latching positioning by mechanical elements is also described It is also described that a magnet yoke in cup form can be associated with the magnet armature to increase the switching speed of the switchgear.

In the low voltage switchgear known from the prior art on which the invention is based, the movable contacts are made as contact bridges that each short-circuit two associated fixed contacts. This does not mean, in the framework of the teaching of the invention, that the movable contacts could not also be made as contact levers that open on one side or the like. Basically, the movable contacts of the contact system could also be moved, not only by the magnet armature but, with a stationary magnet armature, also by a movable magnet coil. However, in practice this is the exception and consequently, is not explained below in more detail. In any case, this kinematic reversal belongs to the teaching of the invention.

In the low voltage switchgear known from the prior art that was explained above, nothing has been said about the control of the magnet coil or magnet coils. From other prior art, it is known to provide low voltage switchgears of the type being discussed, for example, with overcurrent releases (published German application DE-A 3 304 921).

In general, basically, this type of low voltage switchgear previously was divided into various switchgear groups. First, there are known low-voltage fuse switch-disconnectors and low-voltage fuse switches in which fuse links are used to protect against overload current and short-circuit current. A corresponding characteristic curve with switching time depending on the magnitude of the flowing current with respect to disconnection guarantees that no damage can be done. But, after each release of the overload and short-circuit protection, the fuse link must be replaced. Switching on and off is performed as a rule by hand, remote operation is not provided. Since, for example, in a three-phase network, only the fuse link can respond to a switched phase, in some cases, for example, to avoid two-phase operation of a connected three-phase alternating current motor, additional monitoring must be provided. Finally, there exists the danger of switching on when there is a short circuit, in which case the switching-on speed depends on hand operation.

As low voltage switchgears suitable for relatively high nominal currents, contactors are extremely well suited for high numbers of operations. However, suitable fuses would have to be connected upstream from a contactor for overcurrents and short-circuit currents. Mechanical disconnection of a started contactor is not possible, by the way, since the contactor solenoid must be energized during the switching-on period.

Finally, low-voltage circuit breakers are known in which a release for overcurrent and short-circuit current is regularly provided. However, this is performed mechanically by a lock that releases tripping springs. Sometimes metallic preliminary interruptors are allocated that cause an interruption of the circuit after a short time, and thus, guarantee a limitation of the short-circuit current (not reaching the peak value of the current), before the contact system is completely opened by the lock. High numbers of operations usually cannot be achieved with circuit breakers as they can with a contactor.

SUMMARY OF THE INVENTION

The primary object of the present invention is to provide a low voltage switchgear of the type mentioned above that combines the functions of a contactor with the functions of a fuse switch. More specifically, it is a particular object to obtain a timely overcurrent release and an immediate short-circuit current release in as simple a structural way as possible.

These objects are achieved by a low voltage switchgear in which an overcurrent protective circuit is provided and, by overcurrent protective circuit, when an overcurrent, that lies below a threshold overcurrent, appears at least at one connected pole of a magnet coil is energized by direct current, after a certain time delay, in the conduction direction necessary to reach the switching-off position of the magnet armature, and when a current that reaches or exceeds the threshold overcurrent appears, at least at one connected pole, the magnet coil is energized by direct current in the conduction direction necessary to reach the switching-off position of magnet armature with the minimum possible time delay.

The essential thing is that an overcurrent protective circuit that exhibits a very specific described way of operating be allocated to the low voltage switchgear equipped with the magnet armature and magnet coil. This guarantees that, starting at a current that lies with a certain safety margin above the nominal current, an overcurrent function appears that leads to disconnection after a certain time delay. In contrast, it is further assured that exceeding of a threshold overcurrent value leads to an immediate disconnection of the short circuit current. Of special significance, here, is a design by which a time delay controlled as a function of the magnitude of the overcurrent is achieved, so that the disconnection will occur faster the more the flowing current exceeds the nominal current.

The low voltage switchgear according to the invention, thus, first of all, uses the concept, known from the prior art, that the magnet coil—in contrast to the contactor—is energized by direct current only when switched, while it remains de-energized in both rest positions. Thus, the magnet coil can be designed for short-term operation. When designing the magnet armature as a permanent magnet, polarity reversal is necessary for switching over.

While in the low voltage switchgear according to the invention the normal switching on and switching off is, preferably, performed by mutually blocked, in particular electronically blocked switches or push-buttons, during overcurrent or short-circuit current, an automatic switching off of the contact system is achieved, specifically with a switching-off time that is controlled by the current in the affected pole so that the characteristic curve of a fuse results.

The switching voltage for the magnet coil and the supply voltage of the overcurrent protective circuit can be easily taken from the connected poles, so that making a separate auxiliary voltage available is eliminated.

Because of the above-explained concept of the magnet system with a magnet coil energized by direct current only upon switching, the low voltage switchgear can also be switched by hand in case of a power failure.

Because of the above-explained properties, the low voltage switchgear according to the invention needs no additional overcurrent or short-circuit release. It can be used as a contactor and as a fuse switch, and when using suitable arc-quenching devices, as a circuit breaker. Because of the characteristic curve of a fuse that can be realized according to the preferred embodiment of the invention, the disconnect current to be overcome in case of a short circuit can be kept relatively small. The low voltage switchgear is, thus, short-circuit proof without using additional fuses and can be used universally. Areas of application are system voltages up to several hundred volts.

Because of the combining properties of the low voltage switchgear according to the invention, it can replace usual combinations of normal low voltage switchgears explained further above. For example, such possibilities include a combination of a fuse switch-disconnector with a contactor connected downstream, by which high numbers of operations under load are combined with a short-circuit fuse, the combination of a circuit breaker with a contactor connected downstream, and the combination of a smaller circuit breaker with an upstream fuse, etc.

These and other objects, features and advantages of the invention will become apparent from the following detailed description when viewed in conjunction with the accompanying drawings which show several exemplary embodiments in accordance with present invention.

DETAILED DESCRIPTION OF THE PREFERRED EMBODIMENTS

Figure 1:
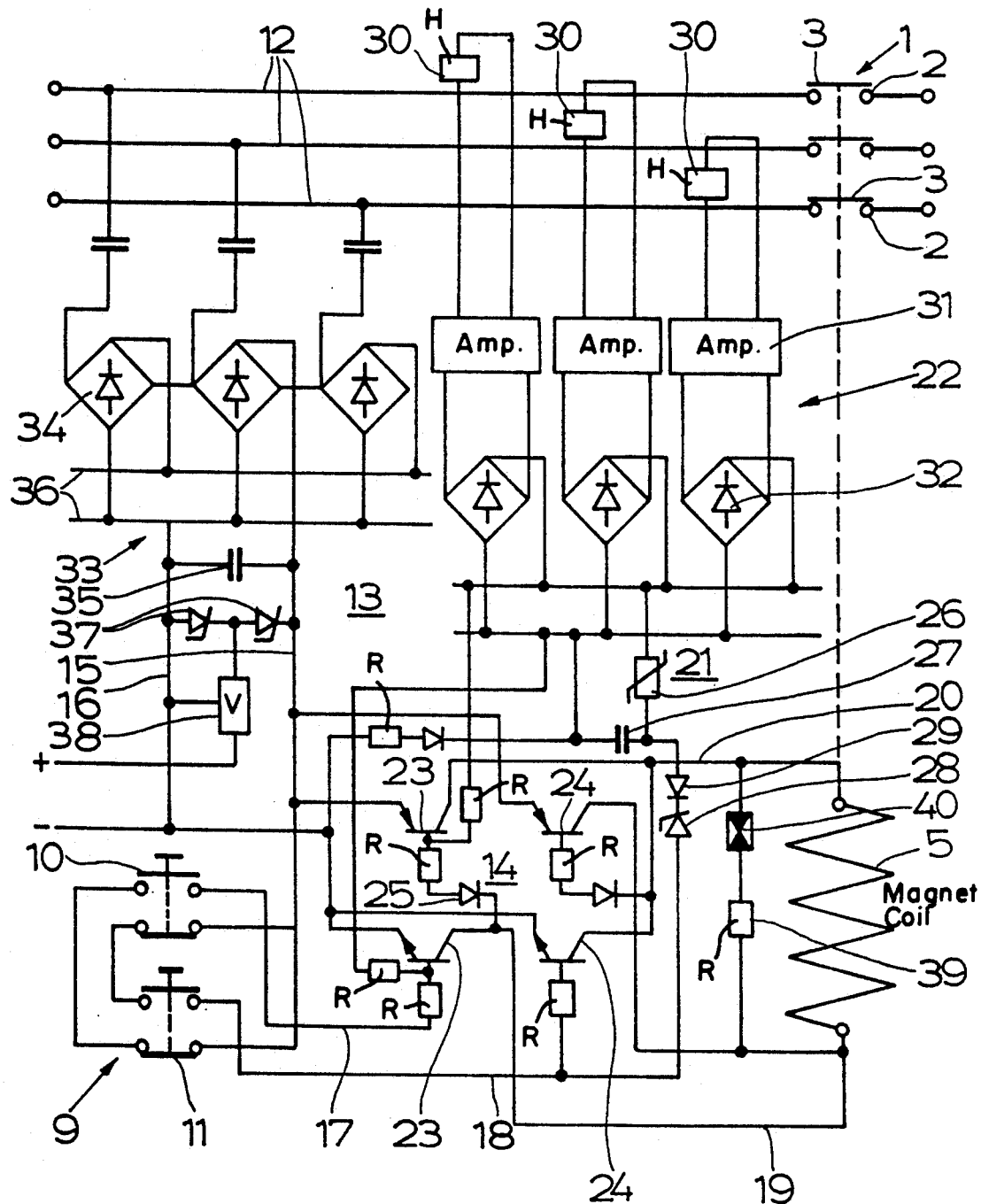
FIG. 1 is a circuit diagram showing a circuit arrangement of a preferred embodiment of a low voltage switchgear according to the invention, in this case, for a three-phase alternating voltage network.
Figure 2:
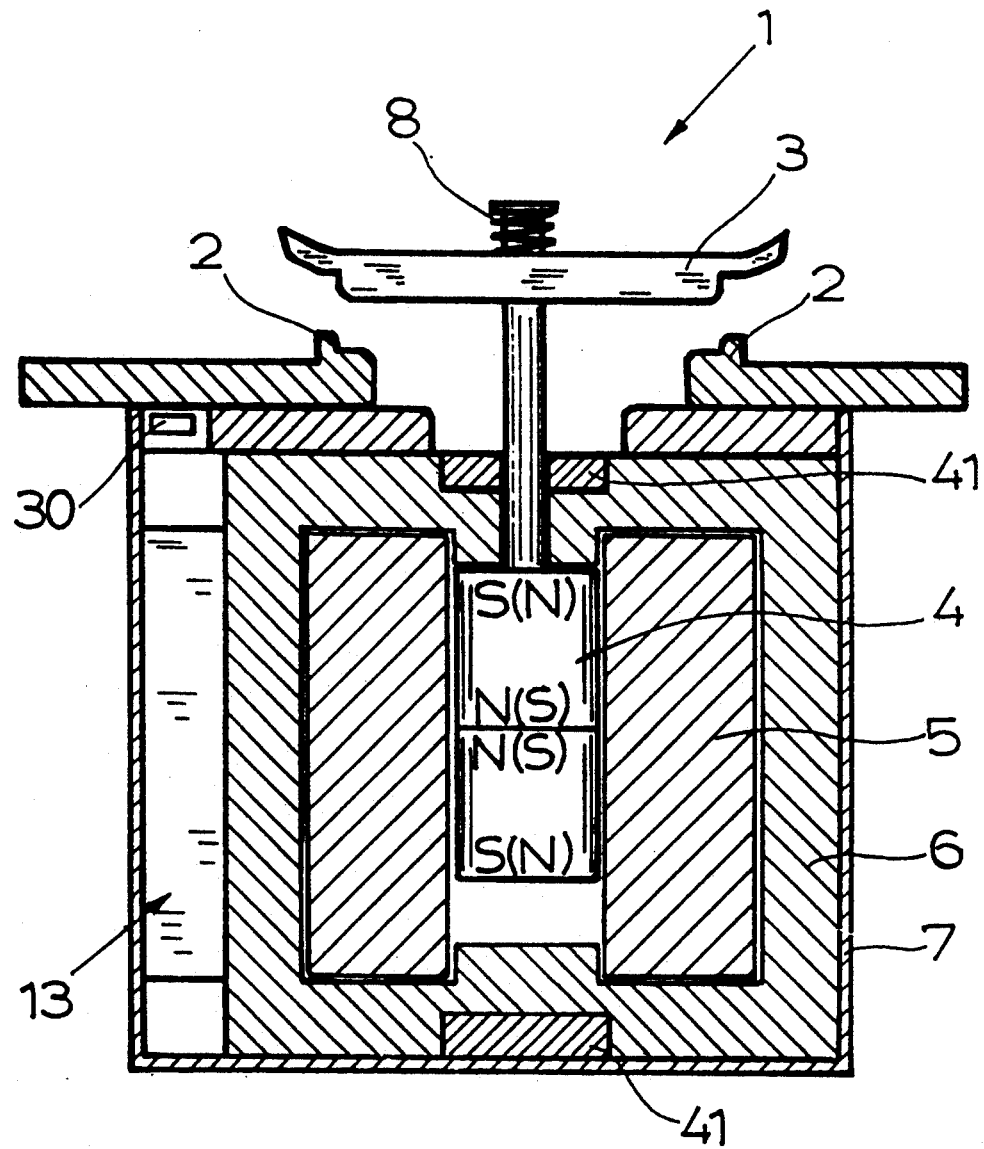
FIG. 2 is a diagrammatic representation of the electromechanical components of a first embodiment of a low voltage switchgear according to the invention.

With reference to FIGS. 1 and 2, a first embodiment of the low voltage switchgear according to the invention will now be explained in detail. Here, a low voltage switchgear for a three-phase alternating voltage network of, e.g., 380 V for nominal currents of, e.g., 100 A can be involved.

First, a multipole contact system 1 with a corresponding number of fixed contacts 2 and movable contacts 3 are provided. These contacts 2, 3 are made, here and according to the preferred teaching, as contact bridges. Movable contacts 3 are moved by a magnet armature 4, which is driven by a magnet coil 5 that is energized by direct current. As already explained above, the movable part could also be magnet coil 5, if the magnet armature in contrast were to be stationary.

As can be seen from FIG. 2, magnet armature 4 is made as a solenoid plunger and is located along with magnet coil 5 in a cup-shaped magnet yoke 6, which is placed in a housing 7. The movable contact 3 made as a contact bridge is carried on top of the magnet armature 4 above both stationary contacts 2, and is subjected to the load of a pressure spring 8 in a direction toward the stationary contacts 2. In the embodiment shown, magnet armature 4 is a permanent magnet armature.

FIG. 1 also shows a setpoint switch release 9 with a push button 10 for switching on and a push button 11 for switching off connected pole 12. Setpoint switch release 9 could also, for its part, in turn contain an electronic circuit if no hand operation, or in any case not only hand operation, is desired.

With respect to the construction of magnet armature 4 and magnet coil 5, it can be seen from FIG. 2 that magnet armature 4 operates in a bistable way by being briefly energized by direct current released by the setpoint switch release from magnet coil 5 with one of two possible conduction directions. In this way, it can be brought into one of two switching positions, namely a switching-on position or a switching-off position. Magnet armature 4 stays in the switching position reached, in each case in the embodiment shown here and preferred, and is kept active in the respective switching position reached, by magnetic force. For this purpose, various embodiments in the prior art may be pointed out, in which also several magnet coils can be allocated to a magnet armature or several magnet armatures may be allocated to a magnet coil.

Now, FIG. 1 shows that the low voltage switchgear according to the invention also includes an overcurrent protective circuit 13. Overcurrent in the sense of the teaching is a current of a magnitude that lies, with a safety margin, above the nominal current of the low voltage switchgear; a very considerable overcurrent that reaches or exceeds a threshold overcurrent is defined as a short-circuit current. By overcurrent protective circuit 13, when an overcurrent that still lies below a threshold overcurrent appears, at least at one connected pole 12, after a certain time delay, the magnet coil 5 is energized by direct current in the conduction direction necessary to reach the switching-off position of magnet armature 4. When a current that reaches or exceeds the threshold overcurrent appears at least at one connected pole 12, a switching off takes place with the minimum possible time delay.

The embodiment shown, and as such especially preferred, is further distinguished in that the time delay is controlled as a function of the magnitude of the overcurrent and, specifically, becomes shorter the greater the overcurrent. With a higher overcurrent value, connected pole 12 is disconnected more quickly. In this way, the overall current load of the low voltage switchgear remains limited somewhat as with a characteristic fuse curve. When the short-circuit current is disconnected, the minimum possible time delay is achieved that should be measured so that the peak value of the short-circuit current is not reached (short circuit current limitation). The minimum possible time delay should, in a normal network with 50 to 60 Hz, be a maximum of 5 ms, preferably a maximum of 3 ms.

In overcurrent protective circuit 13 an electronic control circuit 14 is provided that has switching voltage connections 15, 16, a switching-on control input 17, a switching-off control input 18, a switching-on output 19 and a switching-off output 20. Control inputs 17, 18 are connected to setpoint switch release 9, and magnet coil 5 is connected between outputs 19, 20. In the possible alternative system discussed further above, with two magnet coils to drive a magnet armature, correspondingly the output would be connected respectively at a magnet coil whose other end would lie at a neutral conductor or a reciprocal pole. Switching-off control input 18 of control circuit 14 is also additionally connected by an electronic timer 21 to a control voltage source 22 that is controlled by the current at connected pole or poles 12.

In the embodiment shown in FIG. 1, timer 21 is provided once for all connected poles 12, but with several connected poles 12, a separate timer could be provided for each pole. In any case, the above-explained time delay, which is essential according to the invention, is achieved by electronic timer 21. The combination of electronic timer 21 and a switching-off input 18 that is independent of the setpoint switch release 9 results in the automatic disconnection of connected pole 12 when there is overcurrent for a predetermined time. On the other hand, when a short-circuit current is present, the fastest possible disconnection is then possible.

In the embodiment shown, control circuit 14 is equipped with electronic circuit-breaker elements. Electronic circuit-breaker elements for pulsating direct voltage are, for example, thyristors or triacs, but, in the illustrated, preferred embodiment, power transistors 23, 24 are utilized More specifically, power transistors 23 serve for switching on and power transistors 24 for switching off, and are connected to one another in a complementary way. In the embodiment shown, one power transistor 23 or 24 each is embodied as an n-p-n transistor and the other as a p-n-p transistor. These are thus bipolar transistors Basically, power MOS transistors would also be suitable, and a corresponding adaptation would lie within the level of skill in this art. Also, in the embodiment shown, the outputs 19, 20 of control circuit 14 are connected in the circuit by a circuit breaker element 23 or 24, respectively, to each of switching voltage connections 15, 16, and in each case, two associated circuit breaker elements 23 or 24 are enabled and both of the other circuit breaker elements 24 or 23 are disabled. There is thus a kind of push-pull control of magnet coil 5 by electronic switching elements that switch both connections in each case.

In particular, the circuit is designed so that n-p-n power transistor 23 can be connected for switching on by a base series resistance from push button 10 at positive switching voltage connection 16. Power transistor 23, which is then enabled, draws the collector potential to the potential of negative switching voltage connection 16 so that, on the one hand, the corresponding end of magnet coil 5 is connected to it, and on the other hand, by a base series resistance and a decoupling diode 25, the base of p-n-p power transistor 23 is also negative compared to the emitter, so that this power transistor 23 also is enabled and thus connects the other end of magnet coil 5 to positive switching voltage connection 15.

After releasing push button 10, magnet coil 5 is again de-energized, and magnet armature 4 has reached its switching-on position. The exact opposite occurs for switching off by power transistors 24, which are basically connected in the same way. Because of timer 21, voltage coupling has the same effect, for switching off, on power transistors 24 or on the corresponding circuit breaker elements.

The specific embodiment of control circuit 14, explained above, has the advantage that only the positive phase of power transistors 23 or 24 need to be connected, while the negative phase is automatically connected along with it by sequence control of the respective p-n-p power transistor 23 or 24. Blocking between push buttons 10, 11 prevents simultaneous operation in the switching-on and switching-off direction.

In the embodiment shown according to FIG. 1, timer 21 is made as an RC element and thus exhibits a time-delay resistor 26 and a storage capacitor 27. A normal RC element has a fixed time constant, but in the embodiment shown, time-delay resistor 26 is made as a varistor (VDR, voltage dependent resistor). A varistor is a nonlinear component whose electrical resistance at constant temperature greatly decreases with increasing voltage. Below a certain voltage, the so-called potential barrier, the conductivity is very low, but if the voltage increases, the current rapidly increases (breakdown effect). In and of themselves, varistors are often used for diverting overvoltages. The varistor as time-delay resistor 26 or as a part of a time-delay resistor 26, here, has the particular effect that it achieves, in electronic timer 21, a time constant dependent on the operating voltage. If the output voltage of control voltage source 22 increases with increasing current at connected pole 12, then, because of this the time delay decreases, as desired. This is an especially preferred embodiment of a corresponding time-delay circuit.

It can also be seen in the illustrated embodiment that, in series with timer 21, i.e., specifically in series with time-delay resistor 26, in a branch that leads to switching-off control input 18 of control circuit 14, there is a component with the character of a voltage threshold value, a Zener diode 28 according to the preferred teaching. The voltage arising at storage capacitor 27 is then supplied to switching-off control input 18 only after it reaches a certain minimum value for which the Zener diode is relevant. This component with the character of a voltage threshold value prevents the low voltage switchgear from automatically switching off as a function of the current when currents are too low. Other diodes 29 prevent false voltage ratios, and act as decoupling diodes for one working direction.

The control circuit 14 of the represented, and thus preferred embodiment, is further distinguished by the fact that switching-on control input 17 is connected, optionally, by a limiting resistor, to control voltage source 22, specifically to its pole that is not connected to the latter's switching-off control input 18. For switching on, this additional circuit feeds the base of n-p-n power transistor 23 a negative voltage, which safely disables the latter, while it feeds p-n-p power transistor 23, for switching on, a positive base voltage, which likewise disables the latter. The latter occurs in any case by coupling to the pole of control voltage source 22, which is also connected to switching-off control input 18. This is an additional circuit engineering safety measure that makes possible a safe and rapid switching off when needed.

Depending on the magnitude of the overcurrent or of the short-circuit current, the time constant of timer 21 can change, e.g., by a factor of $10^6$.

Up to now, it has not been explained in detail how control voltage source 22 obtains its own control voltage. In the embodiment shown, for this purpose it is provided that, as it is known from other prior art with general applications, control voltage source 22 contains current sensors that are preferably made as Hall generators 30 and amplifiers 31, and optionally rectifiers 32 on the output side and that are connected to connected poles 12. Rectifiers 32, which are necessary because of the alternating voltage generated by Hall generators 30 and intensified by amplifiers 31, involve usual bridge rectifiers 32 which, on the output side, are connected to busbars. The circuit arrangement with which these components, for their part, are supplied with operating voltage, is not shown here.

The currents flowing in connected poles 12 by contacts 2, 3 of contact system 1 are converted into voltages proportional to the current by current sensors made as Hall generators 30, are amplified in voltage by amplifiers 31 and are then rectified with rectifiers 32. On the output side, a timer 21 is then provided, and as explained above, also several timers could be provided, but then the busbars would be dispensed with.

In the low voltage switchgear shown in FIG. 1, it is especially advantageous that it needs no separate voltage supply. Switching voltage connections 15, 16 belong to a switching voltage source 33 which, on the input side, is connected, preferably, by rectifiers 34 to connected poles or to pole 12 and a counter pole, and preferably, has a storage and smoothing capacitor 35 on the output side. Switching voltage source 33 obtains switching voltage on the output side as a pulsating direct voltage from the network embodied here as a three-phase system.

On the input side, the voltage from three connected poles 12 is coupled by limiting elements, in particular the capacitors shown here, into switching voltage source 33, is fed behind rectifiers 34 to busbars 36, and is fed to storage and smoothing capacitor 35. In a parallel circuit to storage and smoothing capacitor 35, there is provided a series connection consisting of two Zener diodes 37, by which the voltage distribution is performed. A higher voltage, e.g., about 100 V., can be made available as a switching voltage by switching voltage connections 15, 16, while the center tap between Zener diodes 37 is connected to a constant voltage source 38 for a constant low voltage, for example of 12 V for the control electronics or for the power supply of control voltage source 22. This power supply circuit is not further shown, but it can easily be reconstructed how the necessary voltage is obtained here from switching voltage source 33.

In the embodiment shown in FIG. 1, it is further provided that a surge circuit, preferably, a series connection consisting of a resistor 39 and a surge diverter 40, is connected in parallel to magnet coil 5. To most quickly achieve a discharge of the energy stored in magnet coil 5, between a switching on and a switching off or vice versa, surge diverter 40 becomes active in parallel by resistor 39. This surge diverter 40 is a spark gap that disruptively discharges when magnet coil 5 is disconnected. A corresponding time constant is predetermined by resistor 39. Suitably, a timer prevents magnet coil 5 from being immediately activated again by control circuit 14 after a switching on or a switching off until the energy stored in magnet coil 5 has been dissipated by surge diverter 40 after disconnection.

The switchgear embodiment shown in FIG. 2 has a relatively simple design of the usual type, as is known from the above-mentioned prior art. Magnet armature 4 is made as a permanent magnet armature with two permanent magnets associated with one another so that, when magnet coil 5 is de-energized, magnet armature 4 remains in the respective switching position provided. Permanent magnets 41 have a corresponding pole position placed on the tips located in the direction of movement. The space in which overcurrent protective circuit 13 is to be located is indicated diagrammatically on the left in FIG. 2.

Figure 3:
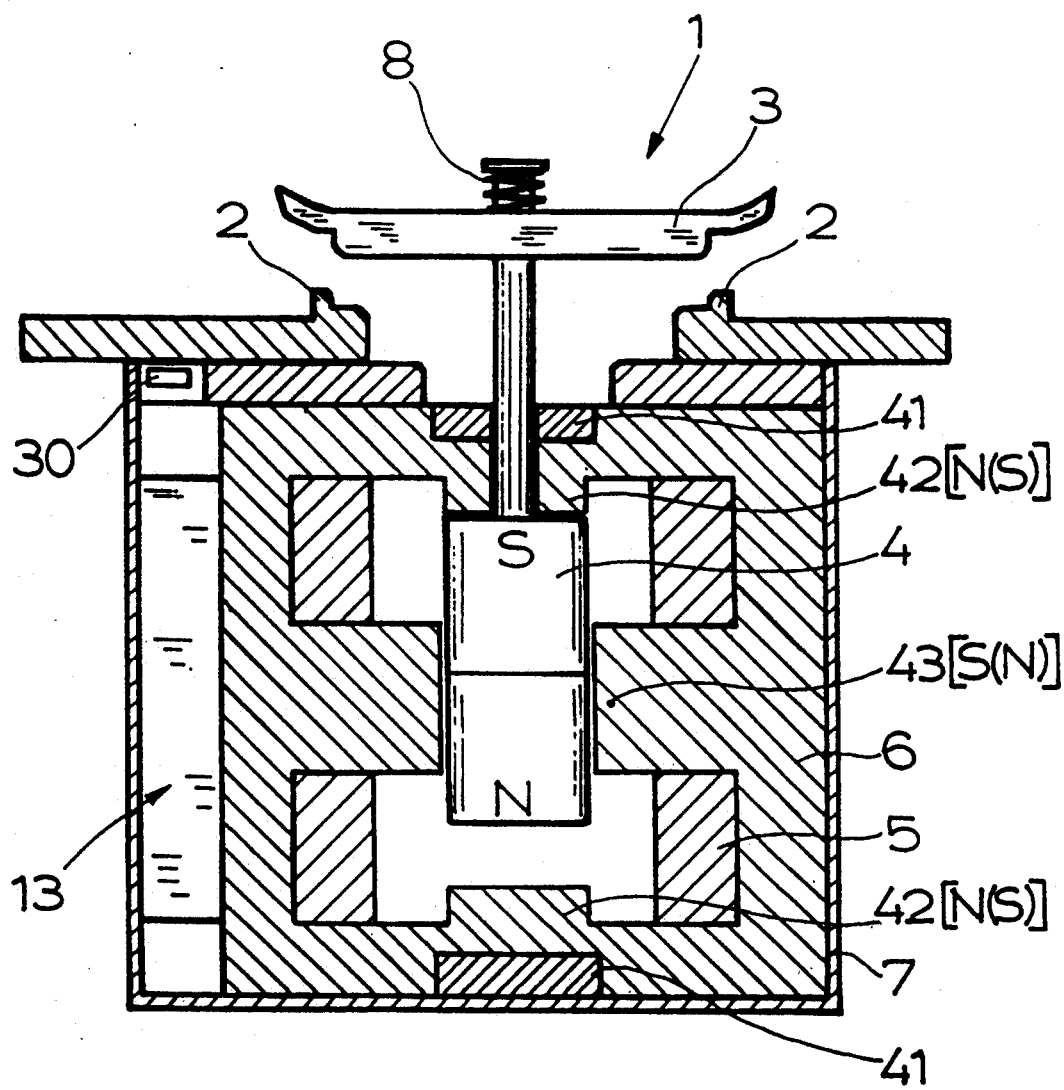
FIG. 3 is a representation corresponding to that of FIG. 2 showing the electromechanical components of a second embodiment.

FIG. 3 differs from the embodiment in FIG. 2 in that an improved response speed is achieved for magnet armature 4. Here, a cup-shaped magnet yoke 6 is associated with magnet coil 5, and magnet armature 4 is made as a permanent magnet-solenoid plunger. Magnet yoke 6 has two pole tips 42 that are oriented in the direction of movement of magnet armature 4 and two pole tips 43 that are oriented crosswise to them in the centrally between the pole tips 42. The pole tips 42 have the same polarity, and the other two pole tips 43 have a polarity that is opposite to that of pole tips 42. In particular, with this configuration, a short switching time is achieved, which is necessary for limiting the short-circuit current when switching off or switching on for short circuiting.

In the circuit, it is not shown that it is suitable to have an especially powerful electric storage device provided behind the network rectifiers. The provision of such an arrangement guarantees a perfect, rapid disconnection, even when the mains switch breaks down. A return of the energy of the mains storage can be prevented by corresponding blocking diodes.

Finally, it is not shown that magnet armature 4 can also be operated mechanically by hand and that a handle is provided for this purpose. Preferably, this handle is not coupled to magnet armature 4 in normal operation but can be coupled to it if need be. In this way, the function and switching speed of the magnet armature 4 is not impaired during operation, but a mechanical operation by hand of the low voltage switchgear is possible in case of emergency.

I claim:

1. Low voltage switchgear for use in alternating voltage systems, comprising at least one pole contact element with a corresponding number of fixed contacts and movable contacts, a magnet armature coupled to the movable contacts for moving them, at least one magnet coil which is energized by direct current and a setpoint switch release for operating the magnet armature in a bistable way so that a brief direct current energizing of the magnet coil in one of two possible conduction directions that is released by the setpoint switch release brings the magnet armature into a respective one of a switching-on and a switching-off position where it remains until a subsequent energization; wherein an overcurrent protective circuit is provided, said overcurrent protective circuit being operative for energizing the magnet coil with direct current in the conduction direction necessary to reach the switching-off position of magnet armature with a predetermined time delay after an overcurrent that lies below a threshold overcurrent appears at least at one connected pole, and for energizing the magnet coil with direct current in the conduction direction necessary to reach the switching-off position of the magnet armature as soon as possible after a current that at least reaches the threshold overcurrent appears at least at one connected pole.

2. Low voltage switchgear according to claim 1, wherein means is provide for controlling the time delay as a function of the magnitude of the overcurrent, and in a way that decreases the time delay with increases in the magnitude of the overcurrent.

3. Low voltage switchgear according to claim 2, wherein an overvoltage circuit is connected in parallel with the magnet coil and comprises a series connection consisting of a resistor and a surge diverter.

4. Low voltage switchgear according to claim 1, wherein the setpoint switch release has two hand-operated push buttons.

5. Low voltage switchgear according to claim 1, wherein an electronic control circuit is provided that comprises two switching voltage connections, a switching-on control input, a switching-off control input, a switching-on output and a switching-off output; wherein control inputs are connected to the setpoint switch release; wherein the magnet coil is connected between the outputs; and wherein the switching-off control input is additionally connected by an electronic timer to a control voltage source that is controlled by the current at the at least one connected pole.

6. Low voltage switchgear according to claim 5, wherein the control circuit is equipped with electronic circuit breaker elements.

7. Low voltage switchgear according to claim 6, wherein said electronic circuit breaker elements comprise power transistors operated in an emitter circuit.

8. Low voltage switchgear according to claim 6, wherein the outputs of the control circuit are electronically connected by a respective circuit breaker element to each of said switching voltage connections; and wherein pairs of associated circuit breaker elements are switched on and off together.

9. Low voltage switchgear according to claim 5, wherein the electronic timer is an RC element.

10. Low voltage switchgear according to claim 9, wherein the RC element comprises a time-delay resistor comprising at least a varistor.

11. Low voltage switchgear according to claim 10, wherein a component with the character of a voltage threshold value is placed in series with the timer.

12. Low voltage switchgear according to claim 9, wherein a component with the character of a voltage threshold value is placed in series with the timer.

13. Low voltage switchgear according to claim 5 wherein a component with the character of a voltage threshold value is placed in series with the electronic timer.

14. Low voltage switchgear according to claim 13, wherein said component with the character of a voltage threshold value is a Zener diode.

15. Low voltage switchgear according to claim 5, wherein the switching-on control input is connected to the control voltage source at a pole which is not connected to the switching-off control input.

16. Low voltage switchgear according to claim 5, wherein the control voltage source comprises current sensors and amplifiers connected to the at least one connected pole.

17. Low voltage switchgear according to claim 16, wherein the control voltage source further comprises rectifiers on the output side.

18. Low voltage switchgear according to claim 5, wherein the switching voltage connections are part of a switching voltage source that is connected by a rectifier to the at least one connected pole at the input side.

19. Low voltage switchgear according to claim 18, wherein the switching voltage source has a storage and smoothing capacitor at the output side.

20. Low voltage switchgear according to claim 5, wherein an overvoltage circuit is connected in parallel with the magnet coil and comprises a series connection consisting of a resistor and a surge diverter.

21. Low voltage switchgear according to claim 5, wherein a hollow magnet yoke is associated with the magnet coil and magnet armature; wherein said magnet armature comprises a permanent magnet-solenoid plunger; wherein the magnet yoke comprises a first pair of pole tips that are oriented in a direction of movement of the magnet armature and a second pair of pole tips that are oriented crosswise to said direction of movement and are positioned centrally between said first pair of pole tips; and wherein the first pair of pole tips have the same polarity, the second pair of pole tips have a polarity that is opposite to that of the first pair of pole tips.

22. Low voltage switchgear according to claim 1, wherein an overvoltage circuit is connected in parallel with the magnet coil.

23. Low voltage switchgear according to claim, 22, wherein the overvoltage circuit comprises a series connection consisting of a resistor and a surge diverter.

24. Low voltage switchgear according to claim 1, wherein a hollow magnet yoke is associated with the magnet coil and magnet armature; wherein said magnet armature comprises a permanent magnet-solenoid plunger; wherein the magnet yoke comprises a first pair of pole tips that are oriented in a direction of movement of the magnet armature and a second pair of pole tips that are oriented crosswise to said direction of movement and are positioned centrally between said first pair of pole tips; and wherein the first pair of pole tips have the same polarity, the second pair of pole tips have a polarity that is opposite to that of the first pair of pole tips.

* * * * *